US007848251B2

(12) United States Patent  (10) Patent No.: US 7,848,251 B2
Jones et al.  (45) Date of Patent: Dec. 7, 2010

(54) ADAPTIVE RATE CONTROL

(75) Inventors: Jason A. Jones, Oxnard, CA (US); Michael T. Guttman, Thousand Oaks, CA (US); Max S. Tomlinson, Jr., Thousand Oaks, CA (US)

(73) Assignee: Topside Research, LLC, Williamsburg, VA (US)

( * ) Notice: Subject to any disclaimer, the term of this patent is extended or adjusted under 35 U.S.C. 154(b) by 37 days.

(21) Appl. No.: 12/506,602

(22) Filed: Jul. 21, 2009

(65) Prior Publication Data

US 2009/0279560 A1  Nov. 12, 2009

Related U.S. Application Data

(63) Continuation of application No. 09/962,056, filed on Sep. 24, 2001.

(51) Int. Cl.
*H04L 12/56* (2006.01)
*H04L 12/26* (2006.01)
*G06F 11/00* (2006.01)

(52) U.S. Cl. .................. 370/252; 370/235; 370/389; 370/413

(58) Field of Classification Search ......... 370/230–236, 370/252–392, 395.21, 395.41, 395.43, 412–428; 709/210–232; 710/29, 52
See application file for complete search history.

(56) References Cited

U.S. PATENT DOCUMENTS

| | | | |
|---|---|---|---|
| 4,330,824 A | 5/1982 | Girard | |
| 4,394,725 A | 7/1983 | Bienvenu et al. | |
| 4,754,451 A | 6/1988 | Eng et al. | |
| 5,404,461 A | 4/1995 | Olnowich | |
| 5,550,823 A | 8/1996 | Irie et al. | |
| 5,606,370 A * | 2/1997 | Moon | 375/240.23 |
| 5,784,003 A | 7/1998 | Dahlgren | |
| 5,859,835 A | 1/1999 | Varma | |
| 5,898,689 A | 4/1999 | Kumar et al. | |
| 6,138,185 A | 10/2000 | Nelson | |
| 6,442,674 B1 | 8/2002 | Lee et al. | |
| 6,487,171 B1 | 11/2002 | Honig et al. | |
| 6,493,347 B2 | 12/2002 | Sindhu et al. | |
| 6,539,026 B1 * | 3/2003 | Waclawsky | 370/428 |
| 6,570,876 B1 | 5/2003 | Aimoto | |
| 6,574,194 B1 | 6/2003 | Sun et al. | |

(Continued)

OTHER PUBLICATIONS

Petaswitch Solutions, Inc., The Pisces Chipset, Product Brief, 2001, http://www.peta-switch.com/products/product_brief.htm.

(Continued)

*Primary Examiner*—Afsar M. Qureshi
(74) *Attorney, Agent, or Firm*—SoCal IP Law Group LLP; Steven C. Sereboff; John E. Gunther

(57) ABSTRACT

Techniques are given for determining the data transmission or sending rates in a router or switch of two or more input queues in one or more input ports sharing an output port, which may optionally include an output queue. The output port receives desired or requested data from each input queue sharing the output port. The output port analyzes this data and sends feedback to each input port so that, if needed, the input port can adjust its transmission or sending rate.

3 Claims, 7 Drawing Sheets

U.S. PATENT DOCUMENTS

| | | |
|---|---|---|
| 6,588,015 B1 | 7/2003 | Eyer et al. |
| 6,611,527 B1 | 8/2003 | Moriwaki et al. |
| 6,658,503 B1 * | 12/2003 | Agarwala et al. ............. 710/35 |
| 6,708,262 B2 | 3/2004 | Manning |
| 6,714,555 B1 * | 3/2004 | Excell et al. ................ 370/418 |
| 6,795,870 B1 | 9/2004 | Bass et al. |
| 6,813,282 B1 * | 11/2004 | Domon ....................... 370/516 |
| 6,836,479 B1 | 12/2004 | Sakamoto et al. |
| 7,072,295 B1 * | 7/2006 | Benson et al. .............. 370/230 |
| 7,362,751 B2 * | 4/2008 | Khacherian et al. ......... 370/389 |
| 7,426,602 B2 | 9/2008 | Stewart et al. |
| 7,639,707 B2 * | 12/2009 | Haywood ................... 370/429 |
| 2001/0037435 A1 | 11/2001 | Van Doren |
| 2003/0035427 A1 | 2/2003 | Alasti et al. |

OTHER PUBLICATIONS

Petaswitch Solutions, Inc., PetaSwitch Solutions Announces Raising $4 Million in First Round Financing, Press Release, 2001, http://peta-switch.com/newsroom/press_releases.htm.

Petaswitch Solutions, Inc., Company Overview, 2001, http://www.peta-switch.com/markets/overview.htm.

Gupta, Scheduling in Input Queued Switches: A Survey, Jun. 1996, Department of Computer Science, Stanford University, California.

Schoenen, et al., Distributed Cell Scheduling Algorithms for Virtual-Output-Queued Switches, Dec. 1999, pp. 1211-1215, vol. 1, Globecom, IEEE Global Telecommunications Conference.

Fahmy, A Survey of ATM Switching Techniques, Aug. 14, 2001, Department of Computer and Information Science, The Ohio State University.

Stiliadis, et al., Rate-Proportional Servers: A Design Methodology for Fair Queueing Algorithms, Dec. 1995, Computer Engineering & Information Sciences, University of California, Santa Cruz.

Stoica, et al., Earliest Eligible Virtual Deadline First: A Flexible and Accurate Mechanism for Proportional Share Resource Allocation, Department of Computer Science, Old Dominion University, Norfolk, VA, revised: Jan. 26, 1996.

* cited by examiner

ADAPTIVE RATE CONTROL

RELATED APPLICATION INFORMATION

This patent is a continuation of application Ser. No. 09/962,056 filed Sep. 24, 2001.

BACKGROUND OF THE INVENTION

1. Field of the Invention

The invention relates generally to the field of packet-switched networks, and in particular to techniques for managing packet traffic inside a router or switch.

2. Background Art

Today, sending information using packets over communications networks, such as the Internet, is widespread. All forms of data including email, documents, photos, video, audio, software updates, are sent via communications lines connected together by routers or switches. The increased data flow has created the need for higher capacity, such as 10 gigabits-per-second (Gbps), network lines. This in turn means that the routers or switches must route these data packets from source to destination in an efficient manner and not become bottlenecks hindering data flow.

FIG. 1 gives an example of a conventional router 100 (or switch). The router 100 takes packets received through its N input (or ingress) ports, e.g., input port 1 110, input port 2 112, input port 3 114, to input port N 116 and routes them via switching fabric 140 to the appropriate M output (or egress) ports, e.g., output port 1 170 through output port M 174 according to commands received from a routing processor 160. The switching fabric 140 in the router 100 is a switching network. Each input port has one or more queues. For example, input port 1 110 shows a queue 120-1 which has an arrival rate of packets 122-1, and a service rate $\mu$ 124-1, which represents the rate the data is sent or transmitted out of the queue 120-1. While FIG. 1 shows only one queue for input port 1 110, the number of queues shown at input port 1 110 is for illustration purposes only and there may be one or more queues per each input port. The output ports typically have one or more output queue per port. For example, in output port 1 170, there is a queue 174 with an arrival rate data of 172 and a service or send data rate of 176. In a conventional router M=N.

An issue of bandwidth allocation occurs when a plurality of input queues send data to a shared output queue. For example, assume that input port 1 110 has input queue 120-1, that input port 2 112 has input queue 120-2, and that input port 3 114 has input queue 120-3. Further assume that they share via switching fabric 140 a common output port queue 174. The send rates, $\mu_i$, associated with the data lines 126, 128, 130, i.e., $\mu_1, \mu_2$, and $\mu_3$, respectively, cannot exceed the maximum arrival rate R 172 of output queue 174. Thus data line 150 which has as its rate, the sum of $\mu_1, \mu_2, \mu_3$ cannot exceed R. The issue in this example is in the allocation of the bandwidth of data line 150 to each of the lines 126, 128, and 130. For example, a poor allocation would give all the available bandwidth to the first two data lines 126 and 128 (input queues 120-1 and 120-2). This would mean the queue 120-3 in input port 3 114 would starve. Thus some form of "fair" allocation between the input queues of the available bandwidth of the shared output queue is needed.

Currently, there are many algorithms for routing data traffic, but each has its own sets of limitations and problems. One example is a rate controlled service discipline, which includes a rate controller and a scheduler. The rate controller has a set of regulators corresponding to each of the connections traversing the switch. The regulators shape the input traffic by assigning an eligibility time to each packet. The scheduler orders the transmission of eligible packets from all the connections. There are several problems with this algorithm. First, the system may be idle even when there are packets waiting to be sent. Next, the single scheduler is a single point of failure. Another example is a conventional shared memory approach, that depends upon a central switch to provide high-speed interconnections to all ports. The problem is that each packet must be examined to determine its routing. Thus this approach requires a very high memory bandwidth and a fairly high overhead even for small systems.

Therefore with the increasing demand for routers that can switch high rates of data, for example, about 10 Gbps, at each input port, there is a need for techniques which efficiently and fairly control the data flow in a router.

SUMMARY OF THE INVENTION

The invention provides techniques for determining the data transmission or sending rates in a router or switch of two or more input queues in one or more input ports sharing an output port, which may optionally include an output queue. The output port receives desired or request data from each input queue sharing the output port. The output port analyzes this data and sends feedback to each input queue so that, if needed, the input queue can adjust its transmission or sending rate. In one embodiment of the invention, a plurality of input queues transfer data to an output queue. Each of these input queues sends the output queue a request sending rate. The request sending rates are summed together. The actual sending rate for one of these input queues is based on this sum. In another embodiment, each input queue sends its queue length or fullness to a shared output port. A derating factor is determined which modifies, if needed, the input queue's actual sending rate. In an alternative embodiment the queue length may be capped at a predetermined value.

In one embodiment of the invention a method for managing data traffic between a plurality of data providers, e.g., input ports, in a router or switch sharing a common data receiver, e.g., output port is provided. The common data receiver has a predetermined maximum receive rate. First, a desired transmission rate between a data provider and the common data receiver is determined. Next, a sum is calculated of a plurality of desired transmission rates, where the sum includes the desired transmission rate. And lastly, an actual transmission rate between the data provider and the common data receiver is determined, where the predetermined maximum receive rate and the sum is used to determine the actual transmission rate.

Another embodiment of the invention provides a method for managing data traffic between a plurality of input queues in a router sharing a common output port. The common output port has a predetermined maximum receive rate. The method includes determining a desired sending rate between an input queue of the plurality of input queues and the common output port; calculating a sum of a plurality of desired sending rates, where the sum includes the desired sending rate; and determining a proportional fair rate between the input queue and the output queue, where the sum is used to determine the proportional fair rate.

Yet another embodiment of the invention provides a system for controlling data flow in a router. The system includes a first determiner configured to determine a desired sending rate between an input queue and an output port; a calculator configured to determine a derating factor based on a sum of a plurality of desired sending rates, where the sum includes the desired sending rate; and a second determiner configured to determine an actual sending rate between the input queue and the output port, where the derating factor is used to determine the actual sending rate.

An embodiment of the invention provides a method for managing packet traffic between a plurality of input queues in a router sharing a common output queue. A length of an input queue of the plurality of input queues is determined. Next, a sum of a plurality of lengths of the plurality of input queues is calculated, where the plurality of lengths includes the length. A derating factor based on the sum is determined and an actual transmission rate of the input queue using the derating factor is determined. In an alternate embodiment the length is capped at a predetermined rate.

One embodiment of the invention provides a method for controlling data flows in a router between a plurality of input queues at a selected priority level of a plurality of priority levels. The plurality of input queues share a common output queue at the selected priority level. The method includes determining a length of an input queue of the plurality of input queues at the selected priority level. Next a sum of a plurality of lengths of the plurality of input queues is calculated at the selected priority level. A derating factor for the selected priority level based on the sum is determined. Lastly, an actual transmission rate of the input queue at the selected priority level using the derating factor is determined. The above procedure is repeated for the remaining priority levels. In one embodiment the procedures for the priority levels are performed concurrently.

These and other embodiments, features, aspects and advantages of the invention will become better understood with regard to the following description, appended claims and accompanying drawings

SPECIFIC EMBODIMENTS OF THE INVENTION

The invention relates to a method and apparatus for managing packet traffic flow in a router or switch. In the following description, numerous specific details are set forth to provide a more thorough description of the specific embodiments of the invention. It is apparent, however, to one skilled in the art, that the invention may be practiced without all the specific details given below. In other instances, well known features have not been described in detail so as not to obscure the invention.

In an embodiment of the invention, the variable and/or fixed sized packets are sent to one or more input queues, where each input queue is partitioned into segments of fixed length, for example, a segment size of 75 bytes. In another embodiment a segment size such as 53 bytes for an ATM cell, may be used. In other embodiments other fixed segment sizes may be used and one or more may correspond to a fixed packet size. These fixed sized segments are sent from the input queues to the output queues. The limitation on how much data can be transferred from the input queues to a shared output queue in a given time period is the maximum receive rate of the shared output queue. Thus the sum of the input queues data transfer or send rates cannot exceed the maximum receive rate of the shared output queue. In one embodiment of the invention the send rates of the input queues to the shared output queue are proportionally allocated. In another embodiment the allocation for each input queue is based on its queue length or fullness and on the maximum number of segments the shared output queue can receive in a selected time period.

Figure 2:
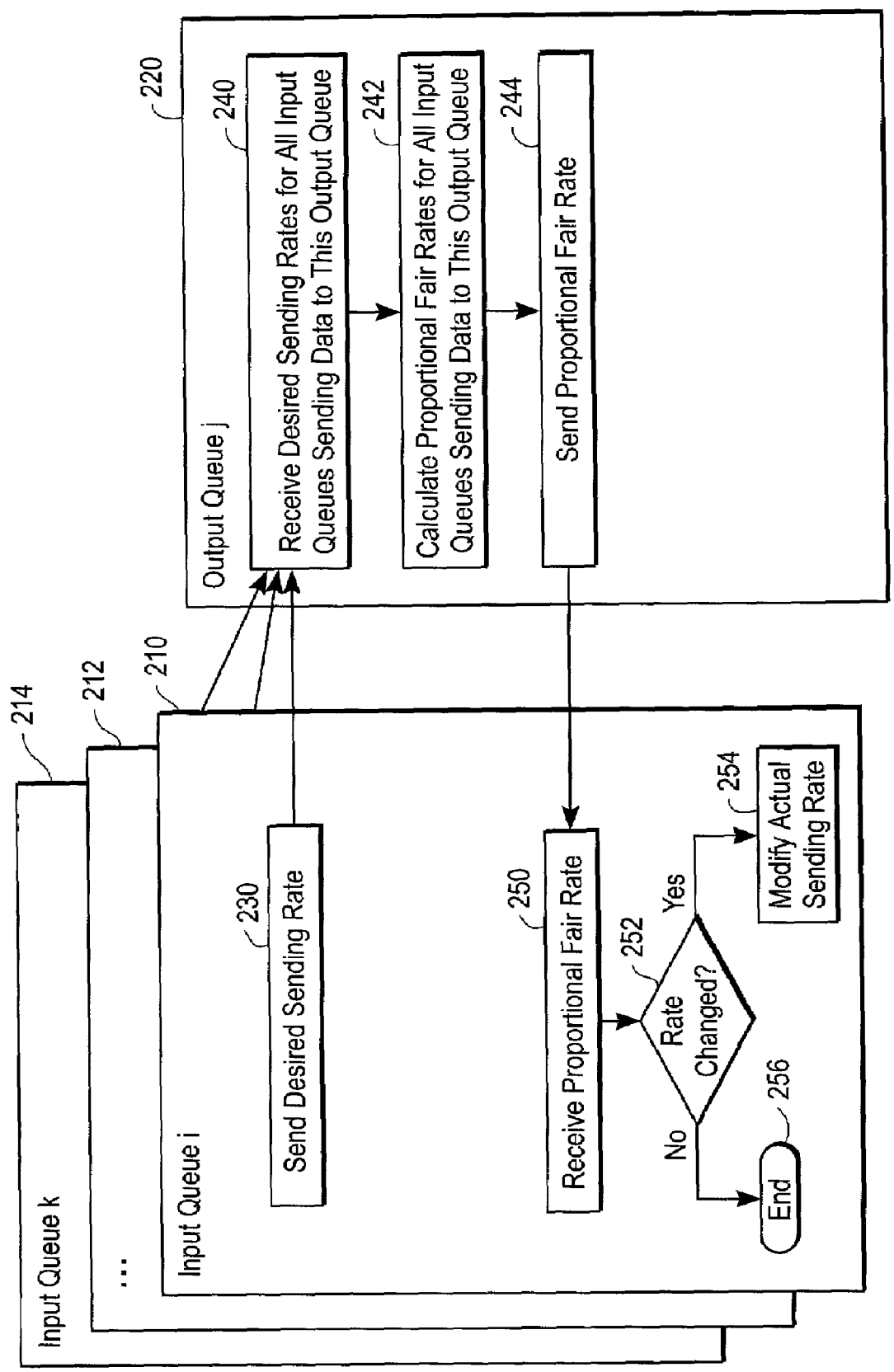
FIG. 2 gives a block diagram showing the determination of a proportional fair rate of one embodiment of the invention.

FIG. 2 gives a block diagram showing the determination of a proportional fair rate of one embodiment of the invention. FIG. 2 shows two or more input queues, i.e., input queue i 210 to input queue k 214, communicating with output queue j 220. Input queue i 210 transmits a requested or desired sending rate, $r_i$, to output queue j 220 (step 230). In one embodiment the requested or desired sending rate may be sent at periodic time intervals. In an alternative embodiment the requested or desired sending rate may be sent, when the input queue i reaches a predetermined level of fullness. At step 240 output queue j 220 gets the requested or desired sending rates from the plurality of input queues sending data to it, i.e., $r_i$ from input queue i 210 to $r_k$ from input queue k 214. At step 242 output queue j 220 calculates the proportional fair rate for each of the input queues (input queue i 210 to input queue k 214). Output queue j 220 first determines a derating factor, $d_j$, by summing up the desired sending rates $r_i$ to $r_k$, symbolized by $\Sigma r_n$, where n is the index for the input queue. The maximum receive rate of output queue j, $R_j$, is then divided by this sum. Thus:

$$d_j = R_j / \Sigma r_n \quad \text{[Eqn. 1]}$$

When the derating factor, $d_j$, is equal to or greater than one (1), then each of the input queues sending data to output queue j 220 can use its requested or desired rates as the actual sending rate, $\mu_n$. For example, at step 252 input queue i 210 will have $\mu_i = r_i$. Thus Equation 1 is modified to:

$$d_j = \min[R_j/\Sigma r_n, 1] \quad \text{[Eqn. 2]}$$

Next the output queue j 220 calculates a proportional rate, $\rho_n(t)$, at time t for each of the sending input queues by derating the requested or desired sending rate:

$$\rho_n(t) = d_j * r_n(t) \quad \text{[Eqn. 3]}$$

The output queue j 220 then sends to each input queue its proportional fair rate (step 244), i.e., $p_n(t)$. For example output queue j at step 244 sends input queue i 250 proportional fair rate, $\rho_i(t)$. Input queue i 210 receivers its proportional fair rate at step 250. If it is different from the present actual sending rate, $\mu_i(t-1)$ (step 252), then input queue i 210 modifies its actual sending rate, $\mu_i(t)$, to the received proportional fair rate at step 252, i.e., $\mu_i(t) \leftarrow \rho_i(t)$. If there is no difference, i.e., $\rho_i(t) = \mu_i(t-1)$, then the sending rate stays the same, i.e., $\mu_i(t) \leftarrow \mu_i(t-1)$.

Figure 3:
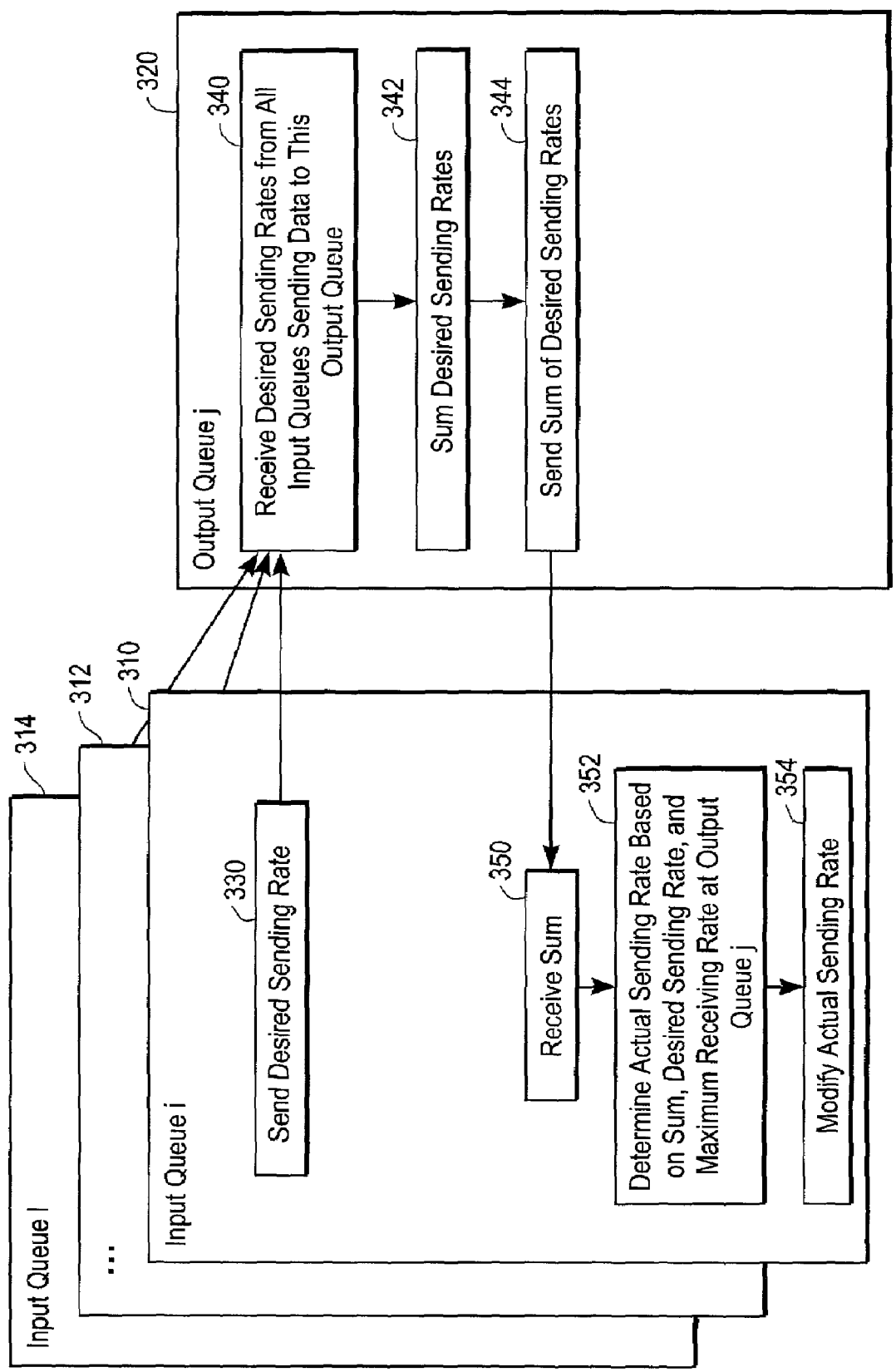
FIG. 3 gives a block diagram showing the determination of a proportional fair rate of another embodiment of the invention.

FIG. 3 gives a block diagram showing the determination of a proportional fair rate of another embodiment of the invention. The embodiment of FIG. 3 is different from the embodiment of FIG. 2 in that the sum is calculated at the output queue j 320 and returned to each input queue. Each input queue, e.g., input queue i 310, then calculates its own derating factor and actual sending rate, $\mu_i(t)$. FIG. 3 shows two or more input queues, i.e., input queue i 310 to input queue k 314, communicating with output queue j 320. Input queue i 310 transmits a requested or desired sending rate, $r_i$, to output queue j (step 330). At step 340 output queue j 320 gets the requested or desired sending rates from the plurality of input queues sending data to it, i.e., $r_i$ from input queue i 310 to $r_k$ from input queue k 314. At step 342 output queue j 320 sums up the desired sending rates $r_i$ to $r_k$, symbolized by $\Sigma r_n$, where n is the index for the input queue. The output queue j 320 then sends each input queue the sum $\Sigma r_n$ (step 344). For example output queue j at step 344 sends input queue i 310 the sum $\Sigma r_n$. Input queue i 310 receivers the sum $\Sigma r_n$ at step 350. Each input queue computes a derating factor:

$$d_j = \min[R_j/\Sigma r_n, 1] \quad [\text{Eqn. 4}]$$

The input queue then calculates it new sending rate, $\rho_n(t)$ (step 352 for input queue i 310):

$$\rho_n(t) = d_j * r_n(t) \quad [\text{Eqn. 5}]$$

Each input queue (step 354 for input queue i) then modifies, if necessary, its sending rate, i.e., $\mu_n(t) \leftarrow \rho_n(t)$.

In another embodiment of the invention, the derating factor, $d_j$, is determined by the lengths of a plurality of input queues sending data to a shared output queue. The send or transmission rate of a first input queue of the plurality is then determined from the length of the first input queue and the derating factor. Since the derating factor is the same across the plurality of input queues sending data to the shared output queue, when the length of the first queue increases, its sending rate increases relative to the other input queues, assuming, for the purposes of this example, that the lengths of the other queues in the plurality stay the same. Thus the bandwidth is reallocated to give relatively more to the first input queue.

In one embodiment each queue is divided into discrete fullness levels. The length of the queue, L, is then measured in integer values. For example, L could represent the number of fixed size segments in a queue. In another example, L could be a number representing the fullness levels inclusively from zero to the capped value. In an alternative embodiment, the fullness corresponds to variable sized regions of the queue. In one embodiment, the transmission or send rates associated with fullness levels are proportional to the length or the fullness level. In another embodiment, the transmission or send rates associated with the length or the fullness levels are a function of the length or the fullness level.

For the following embodiments of the invention, the following terms are defined: the subscript "i" refers to the $i^{th}$ input port and the subscript "j" refers to the $j^{th}$ output port. $L_{ij}$ is the length of the data waiting at the input queue at input port "i," where the input queue sends data to the output queue at output port "j" (also called herein as output queue j). $Q_{imax}$ is the maximum length or size of input queues i. $C_{ij}$ is a capped value for the purposes of determining the send rate, $\mu_{ij}$, of an input queue. $C_{ij} \leq Q_{imax}$. In one embodiment $C_{ij}$ is a predetermined constant C. $Q_{imax}$ is a predetermined constant $Q_{max}$, which is set large enough so that discarded packets are zero or minimized. An example value for C is 255 segments (8 bits). $\mu_{ij}$ is the transmission or sending rate of the input queue at input port i to the output queue at output port j. T is a selected time period. $Lout_j$ is the maximum number of packets that output port j can receive in a time period T. In one embodiment $Lout_j = Lout$ a predetermined constant for all output queues.

Figure 1:
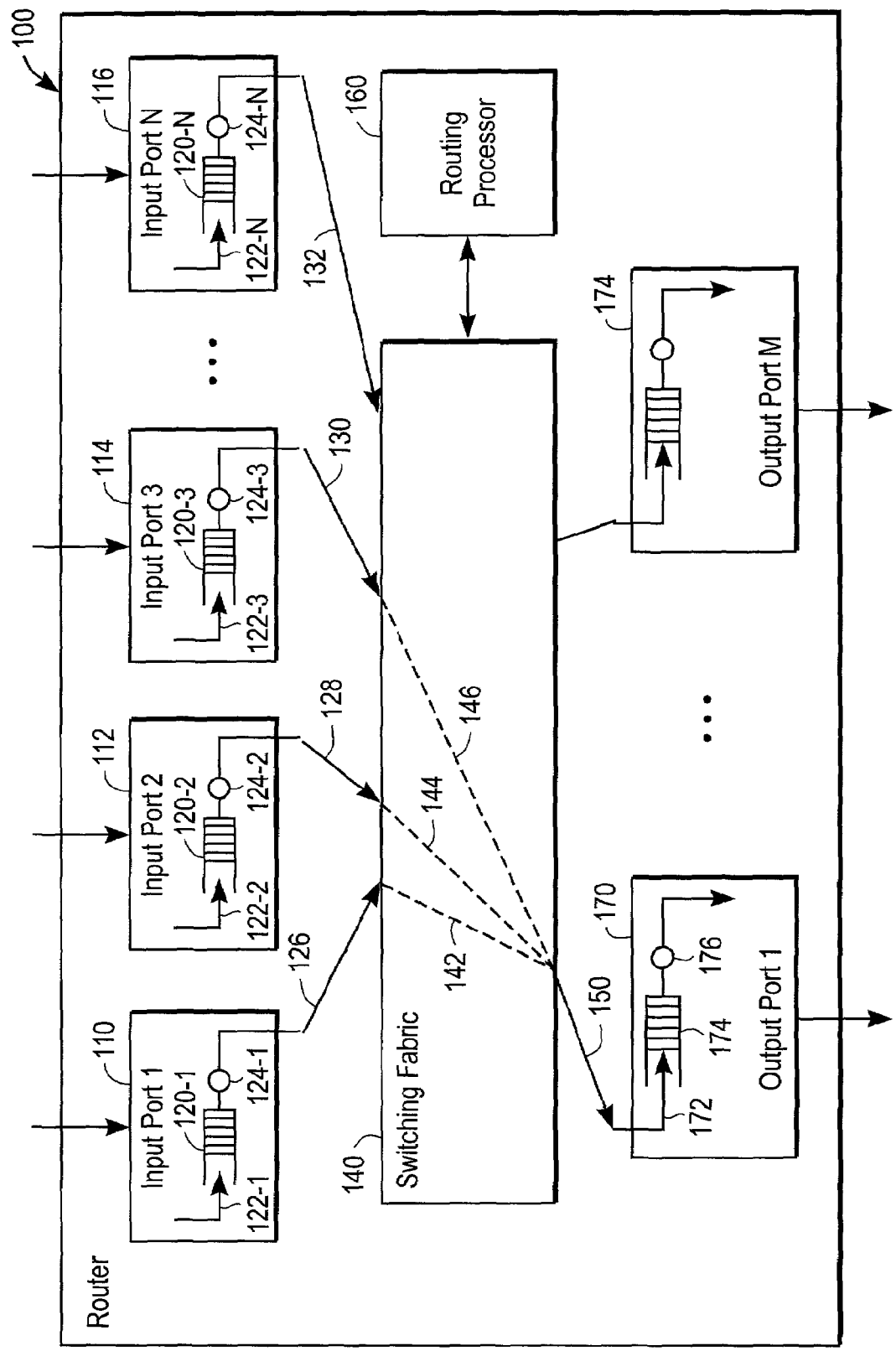
FIG. 1 gives an example of a conventional router or switch (Prior Art).

While there are many technical definitions of fairness, one meaning of max-min fairness used in the following embodiments, includes: 1) no input queue receives more than it requests ($\mu_i \leq r_i$); and 2) $\mu_i = \min(\mu_{fair}, r_i)$; $\mu_{fair}$ is set so that $R = \Sigma u_i$, where the sum is over all the input queues sharing the output queue and R is the maximum receive rate of the shared output queue. For example, in the three input queues, 120-1, 120-2, and 120-3, sharing the one output queue 174 in FIG. 1, let each input queue 120-1, 120-2, and 120-3 request, for example, 0.5 R. A fair allocation for $\mu_1, \mu_2,$ and $\mu_3$ is $\mu_1 \mu_2 = \mu_3 = (\frac{1}{3})$ R.

Figure 4:
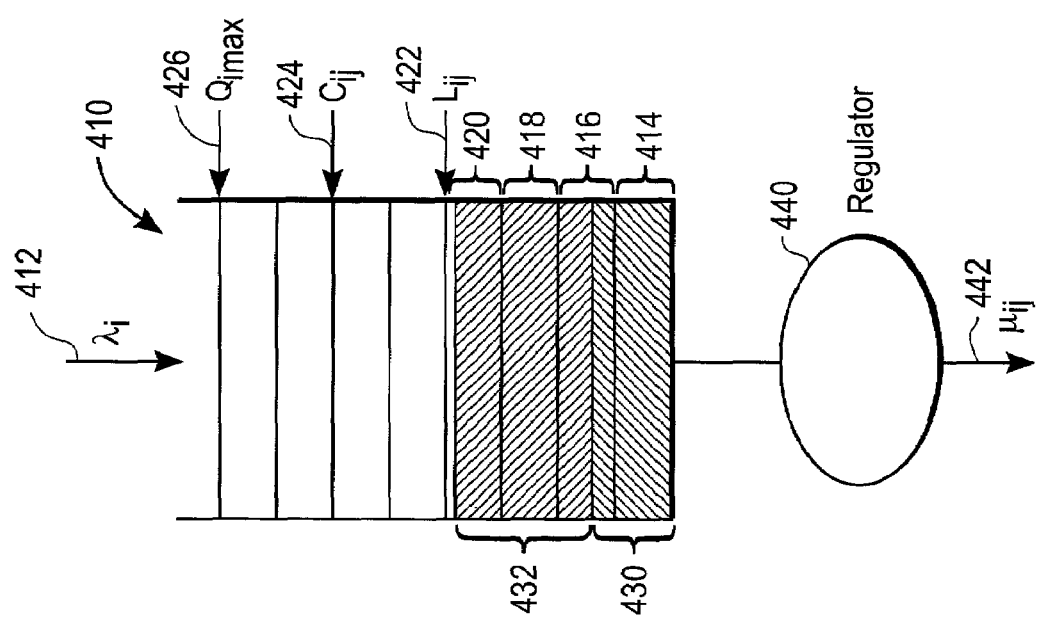
FIG. 4 shows an input queue and regulator of an embodiment of the invention.

FIG. 4 shows an input queue and regulator of an embodiment of the invention. The input queue 410 receives data packets arriving at an arrival rate, $\Lambda_i$, 412. The queue 410 is partitioned into equal sized segments, for example, segments 414, 416, 418, and 420. Packets that arrive, e.g., 430 and 432, fill the queue 410 and are partitioned into segments. For example, packet 430 is partitioned into segments 414 and 416. Packet 432 is partitioned into segments 416, 418, and 420. Looking at it another way, segments 414 and 416 contain packet 430 and segments 416, 418, and 420 contain packet 432, where segment 416 has parts of both packet 430 and packet 432. $L_{ij}$ 422 gives the number of segments in queue 410 that have packets. $C_{ij}$ 424 represents the cap on queue 410 and $Q_{imax}$ 426 is the maximum size or limit of the queue i. The segments go from queue 410 to regulator 440. Regulator 400 transmits segments, unless the queue is empty, in periodic time slots. $\mu_{ij}$ 442 represents the transmission or send rate of the regulator 440.

Figure 5:
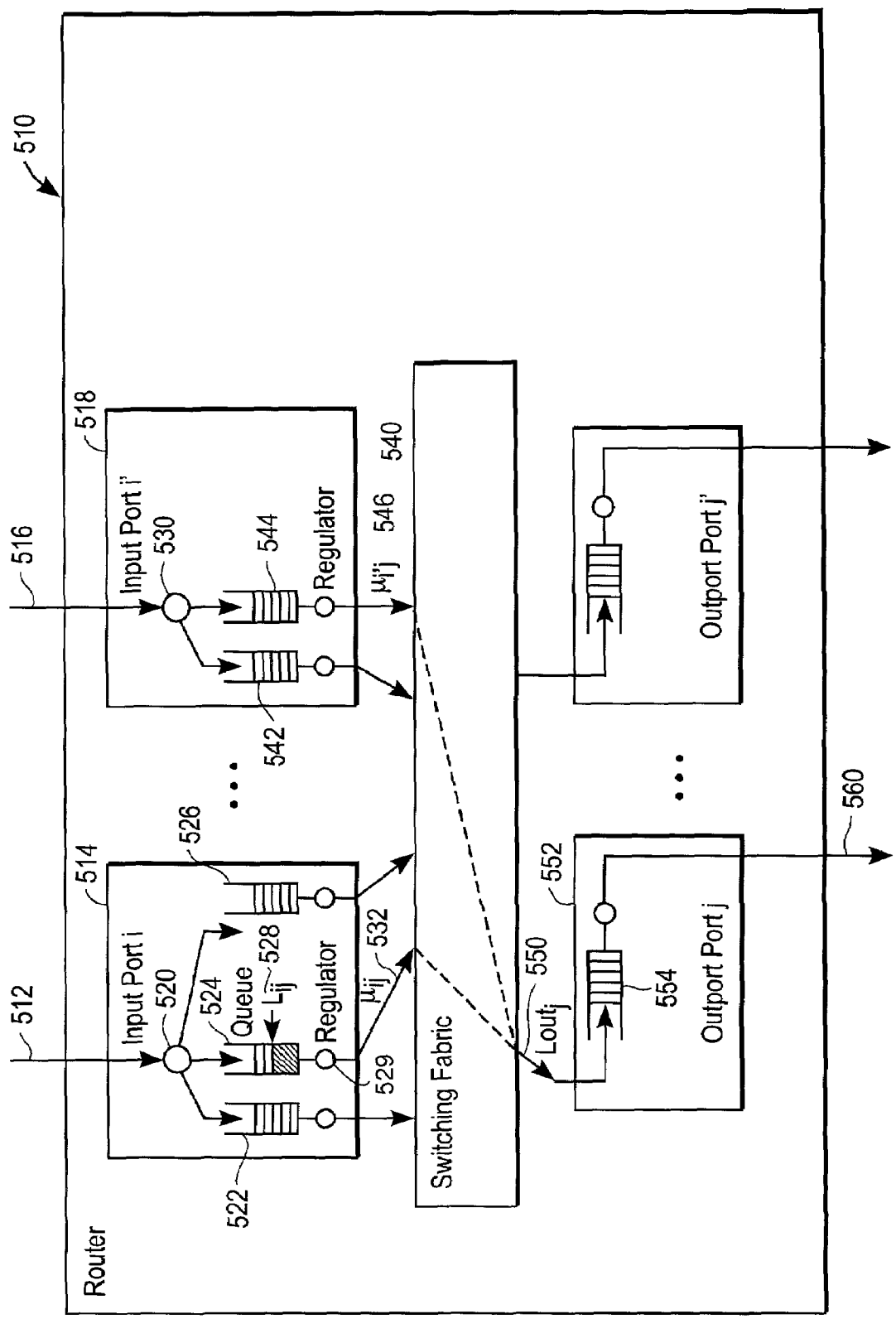
FIG. 5 illustrates an example of a plurality of input ports sending data to a shared output port.

FIG. 5 illustrates an example of a plurality of input ports sending data to a shared output port. The input ports and output ports in router 510 are shown for illustration purposes only. The router 510 has input port i 514 and input port i' 518. The two input ports 514 and 518 are connected through switching fabric 540 to output port j 552. Input port i 514 has packets arriving on data line 512, for example, at 10 Gbps. The data is then split by a device 520 to queues 522, 524, and 526. Queue 524 has its packets divided into segments and conditioned for transmission by regulator 529. Regulator 529 sends it segments via data line 532 at rate $\mu_{ij}$ to output port j 552 via switching fabric 540. Input port i' 518 has an input queue 544 which also shares output queue j 552 via switching fabric 540. $Lout_j$ is the maximum amount of segments output port j 552 can receive within a time period T via input data line 550. Output port j 552 sends data out of router 510 on data line 560.

In one embodiment of the invention the router has N input or ingress ports and M output or egress ports. In order to avoid head-of-line (HOL) blocking there are M input queues at an input port, i.e., one input queue for each output port. Thus there are N×M input queues in the input ports. In one implementation M=N and more specifically M=N=64. However, in other embodiments M and/or N may be different numbers. These M input queues are called virtual output queues (VOQs).

Let $\rho_{ij}(t)$ be the length of a VOQ, i.e., an input queue of input port i sending data to an output port j, capped at C.

$$\rho_{ij}(t) = \min[L_{ij}, C] \quad [\text{Eqn. 6}]$$

In one embodiment of the invention the calculations are done in discrete time. At each time step each input port samples and transmits the new queue length $\rho_{ij}$ to the output port and each output port calculates and transmits the transmission rate $\mu_{ij}$ to the input port. An intermediate value called the derating factor $d_j(t)$ is calculated based on $\rho_{ij}$ and the total number of segments, Lout, an output port can receive in time T.

$$d_j(t) = \min[Lout/\Sigma \rho_{ij}(t), 1] \quad [\text{Eqn. 7}]$$

From Equation 7 when the derating factor is one, then Lout>=Σρ$_{ij}$(t). This means that given a time period T in which all the segments in the input queues having lengths ρ$_{ij}$(t), are sent to the output queue at output port j, the output queue can accept all segments sent. Thus the input queues may drain all segments present.

When from Equation 7 the derating factor is less than one, i.e., Lout<Σρ$_{ij}$(t), then there are more segments in the VOQs than can be received by the shared output queue in a time T. Thus the actual transmission rate sent back to each input queue sharing output port j is:

$$\mu_{ij}(t)=d_j(t-1)*(\rho_{ij}(t-1)/T) \quad [\text{Eqn. 8}]$$

When d$_j$(t)<1, Equation 7 can be substituted into Equation 8 and manipulated to get:

$$\mu_{ij}(t)=(\rho_{ij}(t-1)/\Sigma\rho_{ij}(t-1))*(Lout/T) \quad [\text{Eqn. 9}]$$

where the maximum receive rate at the output queue is Rmax=Lout/T.

Because ρ$_{ij}$(t) is capped at C, as seen from Equation 9, VOQs with large numbers of packets above C cannot dominate the bandwidth allocation as they could in a pure proportional allocation. In the congested case, when all queues are above their cap, each VOQ gets an equal allocation. Thus by feeding back the capped queue fullness, this technique achieves max-min fairness.

An analysis of an embodiment of the invention showing max-min fairness for the congested case may be done under certain conditions. The analysis starts by examining the dynamic case. First, the change of the fullness of the VOQ is determined. The rate of data entering a VOQ is quantized in time, as the amount of data entering the VOQ during the current segment of time. This rate of data entering a VOQ is called Λ$_{ij}$(t). The change in the amount of data residing in a VOQ is then the difference of the rate of data entering and the rate of data leaving the VOQ:

$$L_{ij}(t+1)-L_{ij}(t)=\Lambda_{ij}(t)-\mu_{ij}(t) \quad [\text{Eqn. 11}]$$

Substituting Equation 7 into Equation 8 and then Equation 8 into Equation 11 we get:

$$L_{ij}(t+1)-L_{ij}(t)=\Lambda_{ij}(t)-\min[Lout/\Sigma\rho_j(t-1),1]\times\rho_{ji}(t-1)/T \quad [\text{Eqn. 12}]$$

Then, applying Equation 6 and solving for ρ$_{ij}$(t+1) we get:

$$\rho_{ij}(t+1)=\min[\rho_{ij}(t)+\Lambda_{ij}(t)-\min[Lout/\Sigma\rho_j(t-1),1]\times\rho_{ji}(t-1)/T,C] \quad [\text{Eqn. 13}]$$

In the congested case there will be more data in the VOQ than can be supported on the egress link and Equation 13 reduces to:

$$\rho_{ij}(t+1)=\min[\rho_{ij}(t)+\Lambda_{ij}(t)-(Lout/\Sigma\rho_j(t-1))\times\rho_{ji}(t-1)/T,C] \quad [\text{Eqn. 14}]$$

In the steady state the incoming rates Λ$_{ij}$(t) do not change with time. This then gives constant values of ρ$_{ij}$(t) and μ$_{ij}$(t). These steady state constant values are denoted as follows:

$$\Lambda_{ij}(t)=>\Lambda c_{ij} \quad [\text{Eqn. 15}]$$

$$\rho_{ij}(t)=>\rho c_{ij} \quad [\text{Eqn. 16}]$$

$$\mu_{ij}(t)=>\mu c_{ij} \quad [\text{Eqn. 17}]$$

Steady state congestion is assumed for all the flows associated with the same egress port. When the sum of incoming rates for all the flows to the same egress port exceed the sum of allocated weights, congestion exists for those flows. For each egress port j, the congestion relation summed over the ingress ports i, then is:

$$\Sigma_i \Lambda c_{ij} > \Sigma_i \mu c_{ij} \quad [\text{Eqn. 18}]$$

This scheme allocates bandwidth out of the VOQs based on each queues capped length ρc$_{ij}$. In the congested steady state this set of bandwidth allocations converge on a set of constant bandwidth allocations. It can be shown that this set of constant bandwidth allocations is max-min fair across ingress rates.

First, express Equation 14 for the congested steady state:

$$\rho c_{ij}=\min[\rho c_{ij}+\Lambda c_{ij}-(Lout/\Sigma\rho c_{i\cdot j})\times\rho c_{ij}/T,C] \quad [\text{Eqn. 19}]$$

Substituting Equation 7 and Equation 8 to express Equation 19 in terms of μ:

$$\rho c_{ij}=\min[\rho c_{ij}+\Lambda c_{ij}-\mu c_{ij},C] \quad [\text{Eqn. 20}]$$

There are two cases satisfying Equation 20: either the first expression or the second expression is the minimum. Either ρc$_{ij}$ is capped at C or ρc$_{ij}$ is less than C and is as shown below:

$$\rho c_{ij}=\rho c_{ij}+\Lambda c_{ij}-\mu c_{ij} \quad [\text{Eqn. 21}]$$

This requires the following to hold:

$$\Lambda c_{ij}=c_{ij} \quad [\text{Eqn. 22}]$$

Simply put, in the congested steady state, by capping the measured fullness of the VOQ this technique also caps the bandwidth allocated to those VOQs with larger incoming data rates. This capped allocated bandwidth is achieved when ρ=C. From Equation 8:

$$\mu capped_j = d_j \times C/T \quad [\text{Eqn. 23}]$$

Those ingress VOQs with data rates less than μcapped$_j$ are allocated their full data rate. Also, no VOQ is allocated more bandwidth than it can consume. This satisfies all three conditions of the max-min fairness criteria.

Figure 6:
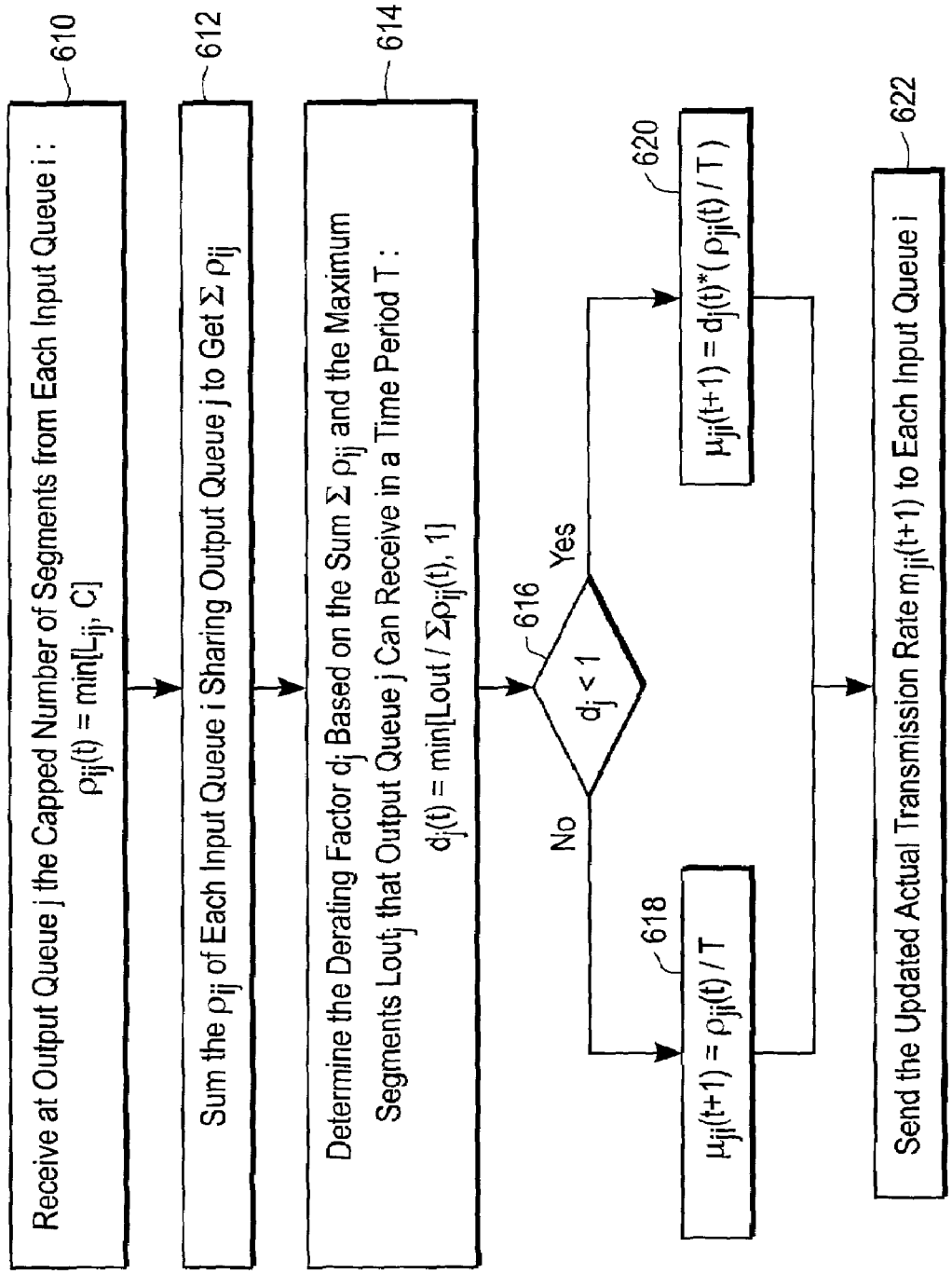
FIG. 6 gives a flowchart showing the calculation of a VOQ transmission rate of an embodiment of the invention.

FIG. 6 gives a flowchart showing the calculation of a VOQ transmission rate of an embodiment of the invention. At step 610 the capped number of segments is determined in a VOQ, i.e. the capped VOQ length is determined. At step 612 the sum of the capped number of segments in the each VOQ sharing an output queue is calculated. The derating factor is determined based on the sum and the maximum number of segments that the shared output queue can receive in a time T (step 614). At step 616 the derating factor is tested. If the derating factor is not less than one then the VOQ transmission rates are proportional to the VOQ length (step 618). Thus up to a capped amount, the longer queues get more bandwidth. If the derating factor is less than one, then each VOQ's transmission rate is proportional to the derating factor and the VOQ's length (step 624). At step 622 the updated actual transmission rate is sent by the output queue to the input queues.

In another embodiment, input ports are associated with different priority levels. In one embodiment, the output queue calculates derating rates and transmission or send rates for each VOQ at each priority level. In this embodiment, the send rate for a VOQ depends on the priority associated with the VOQ. An example is a router where sixty-four input ports transmit data to sixty-four output ports, i.e. M=N=64. In this embodiment, data is categorized by a plurality of priorities, for example, five priority levels. Each input port has a set of input queues for each output port, and each set has an input queue for each priority level. Thus, each input port has 320 queues. Each output port has one output queue. In other embodiments there may be different number and variations of input and output queues and/or ports. For example, there may be two or more output queues per output port or there may be two or more input queues per output port or an output port may have no queue.

Figure 7:
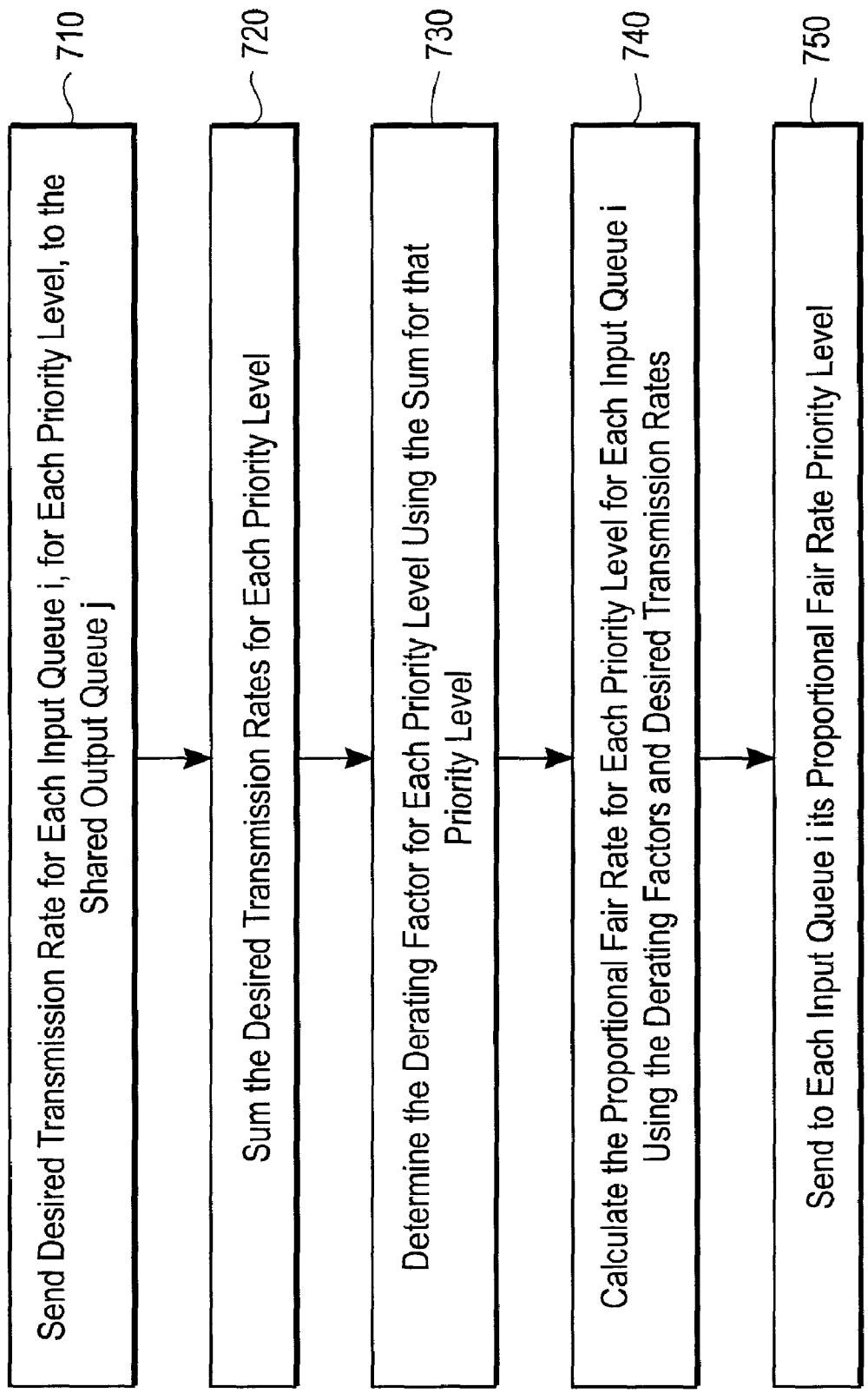
FIG. 7 illustrates the process of determining a transmission rate by priority level in accordance with one embodiment of the invention.

FIG. 7 illustrates the process of determining a transmission rate by priority level in accordance with one embodiment of the invention. At step 710, input queue i, sends its desired transmission rate for each priority level of a plurality of priority levels to an output queue j at output port j. This process is repeated for the other input queues sending data to the same output queue j. At step 720, for each priority level, output queue j calculates a sum of the desired transmission rates of the input queues that wish to transmit data at that priority level. Next, a derating factor is calculated for each priority level using the sum for that priority level and the maximum receive rate of the output queue j (step 730). At step 740, the proportional fair rate, i.e., the actual transmission rate, for an input queue is calculated for each input queue sharing output queue j at each priority level by multiplying the derating factor times the desired transmission rate for each input queue for each priority level. The derating factor is capped at one. At step 750 the output queue j transmits the actual transmission rate per priority level to each input queue. At an input queue the actual transmission rate is modified, if necessary. The above flowchart is repeated concurrently for each of the output queues that are shared. If an output queue is not shared between input queues, then either the above process is also followed or the input transmission or sending rate is whatever is requested or desired up to a capped rate of the maximum receive rate of the output queue.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the invention has been described using a particular series of transactions and steps, it should be apparent to those skilled in the art that the scope of the invention is not limited to the described series of transactions and steps.

Further, while the invention has been described using a particular combination of hardware and software, it should be recognized that other combinations of hardware and software are also within the scope of the invention. The invention may be implemented only in hardware or only in software or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

It is claimed:

1. A data transfer apparatus comprising:
   a switching fabric for switching data packets
   a plurality of output ports, wherein each output port includes an output queue
   a plurality of input ports coupled to the output ports through the switching fabric, wherein each input port includes a plurality of input queues respectively coupled to each of the output queues
   a plurality of regulators disposed in the output ports and the input ports, the regulators operable in concert to manage data flow from the input queues to the output queues, wherein the regulators are operable to reduce for each input queue ij associated with the output queue j an amount of data that the input queue ij desires to send to the output queue j at the time t to $\mu_{ij}(t)$, wherein if output queue j cannot accommodate all of the data the input ports desire to send to output queue j, then $\mu_{ij}(t)=(\rho_{ji}(t-1)/\Sigma\ \rho_{ij}(t-1))*(Lout_j/T)$, wherein $\rho_{ij}$ is a length of a virtual output queue corresponding to an amount of packets at input queue ij capped at a length C and $Lout_j$ is a total number of packets which output queue j can receive in a selected period of time T.

2. The apparatus of claim 1
   wherein the input queues are adapted to receive packets of variable length.

3. In a data transfer apparatus comprising a plurality of input ports coupled to a plurality of output ports through a switching fabric, wherein each output port includes an output queue and each input port includes a plurality of input queues equal in number to the plurality of output queues, a process for managing packet traffic flow to obtain high rates of data, the process comprising:
   at a time t, for each output queue j, determining $\Sigma\ \rho_{ij}(t)$
   for each output queue j, determining a derating factor $d_j(t)=\min[Lout_j/\Sigma\ \rho_{ij}(t), 1]$
   for each input queue, determining an actual transmission rate $\mu_{ij}(t)$, wherein if $d_j(t)$ is less than 1, then $\mu_{ij}(t)= (\rho_{ji}(t-1)/\Sigma\ \rho_{ij}(t-1))*(Lout_j/T)$, else $\mu_{ij}(t)=\rho_{ji}(t)$
   transmitting data from the input queues to the output queues in according with the actual transmission rates
   wherein
      i is an index to the input ports
      ij identifies a one of the input queues of input port i which is coupled to output queue j
      $\rho_{ij}$ is a length of a virtual output queue corresponding to an amount of packets at input queue ij capped at a length C
      $Lout_j$ is a total number of packets which output queue j can receive in a selected period of time T.

* * * * *